Jan. 14, 1941.   C. BIRDSEYE   2,228,999
ART OF FREEZING FOOD PRODUCTS
Filed March 8, 1939   5 Sheets-Sheet 1

Inventor:
Clarence Birdseye
by Kenway & Witter Attorneys

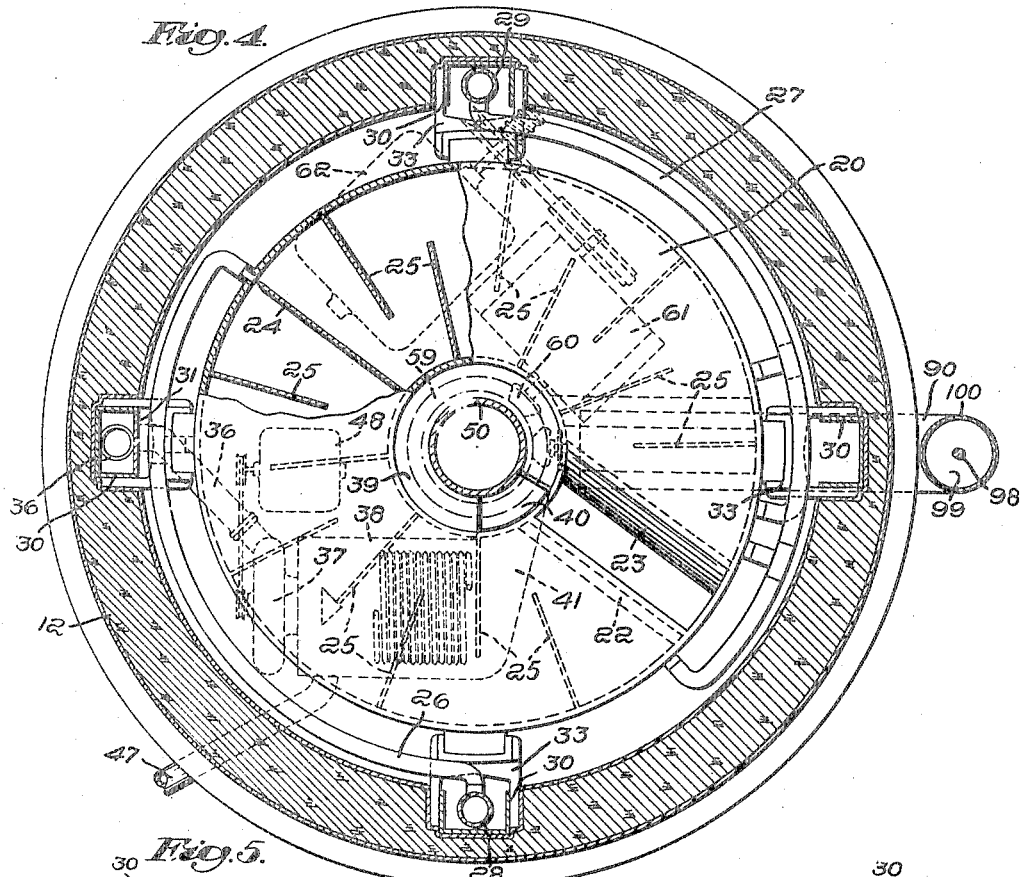
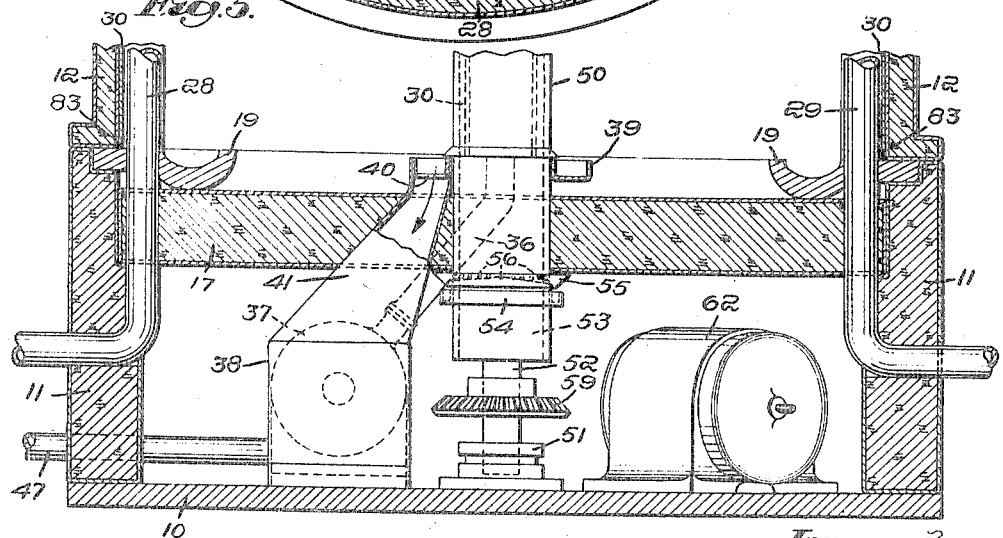

Jan. 14, 1941. C. BIRDSEYE 2,228,999
ART OF FREEZING FOOD PRODUCTS
Filed March 8, 1939 5 Sheets-Sheet 4
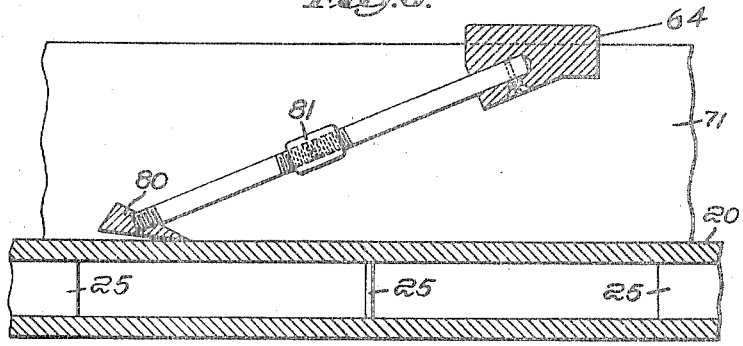
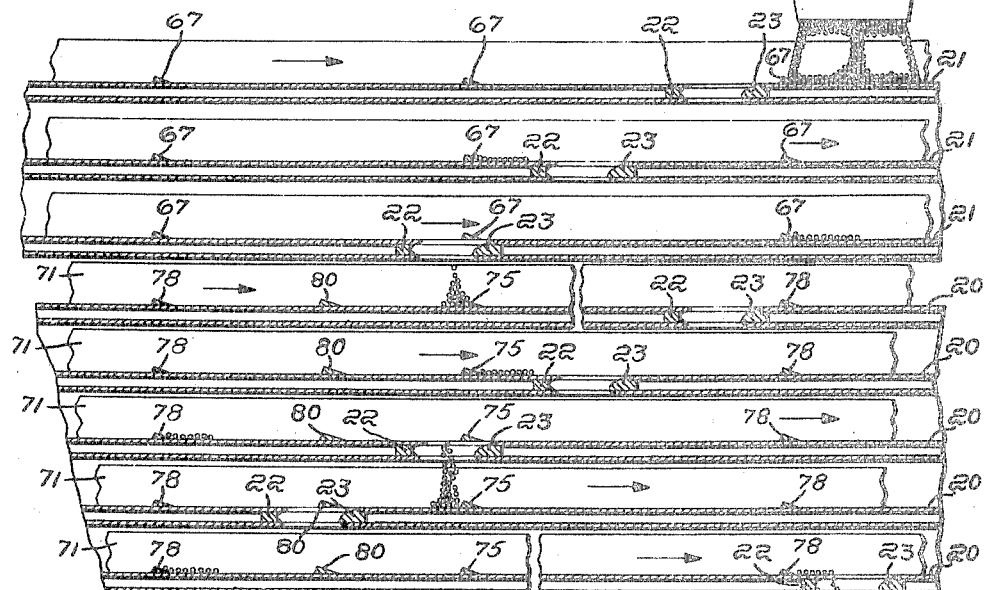
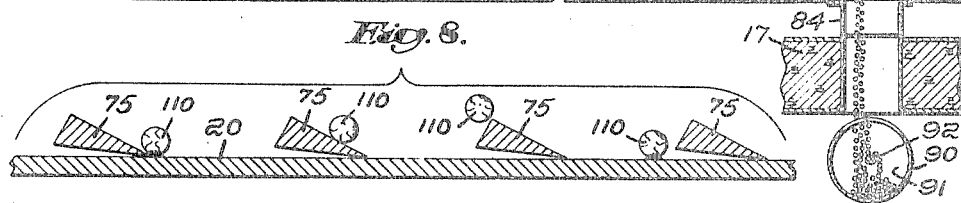

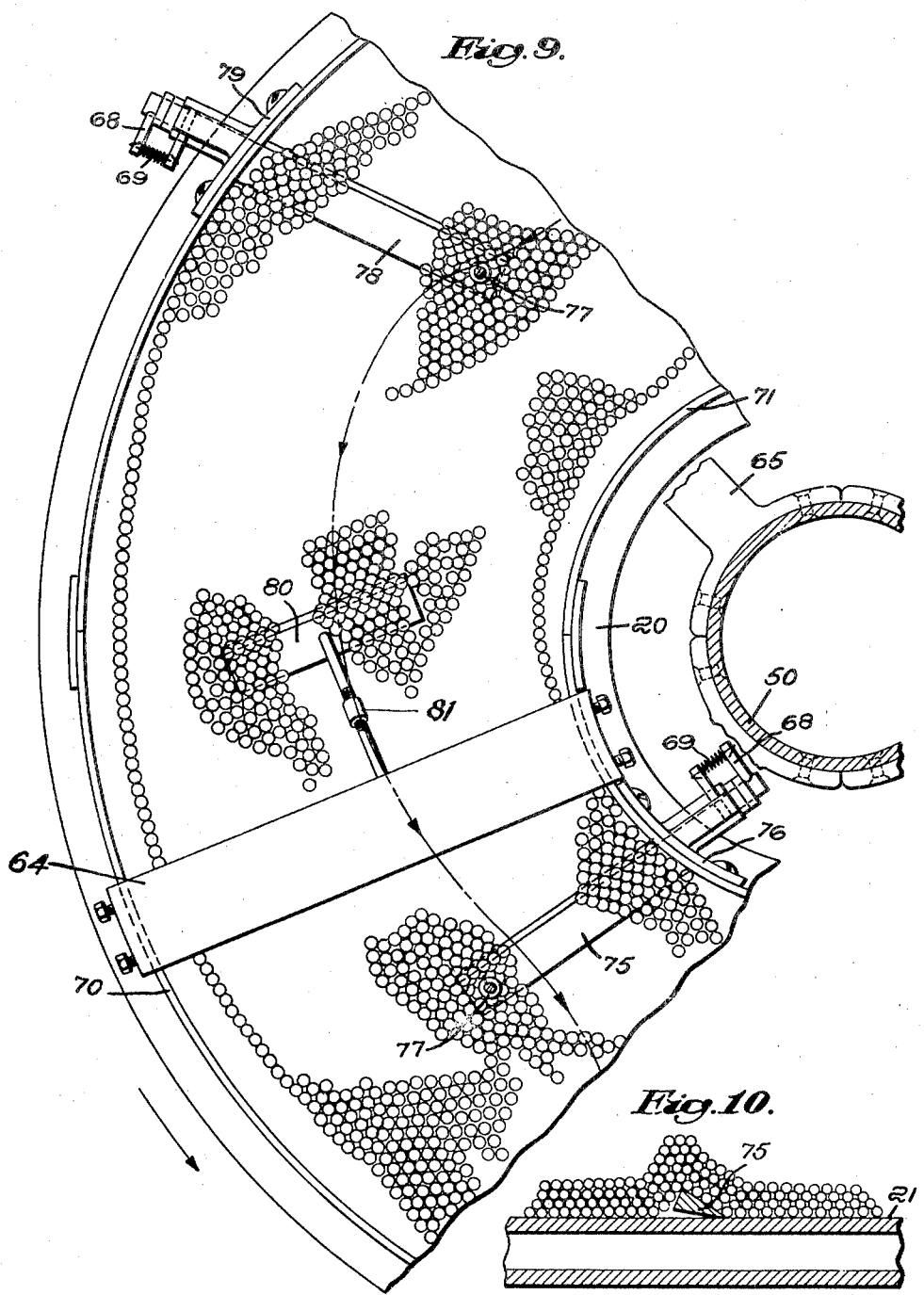

Patented Jan. 14, 1941

2,228,999

UNITED STATES PATENT OFFICE 2,228,999

ART OF FREEZING FOOD PRODUCTS

Clarence Birdseye, Gloucester, Mass., assignor to Mechanical Research, Inc., Providence, R. I., a corporation of Rhode Island Application March 8, 1939, Serial No. 260,573

31 Claims. (Cl. 62—173)

This invention relates to the freezing or quick freezing of solid or liquid food products or combinations of solid and liquid food products. In one aspect the invention comprises a novel continuous process whereby such products may be frozen in any desired quantity and to any desired degree of congelation. In another aspect it comprises an improved freezing apparatus of the multiple plate type, compact in structure, efficient in operation and particularly well adapted for carrying out the process of my invention.

My invention solves the problem of freezing moist or moisture-containing food products with the assistance of refrigerated plates over and in direct contact with which the product is moved and to which the product units or the mass of the product naturally tends to stick by freezing. I have solved this problem so completely that in accordance with my new process it is entirely practicable for me to freeze such moist delicate food products as oysters, strawberries, or fresh peas without in any way damaging or mutilating them.

It will be understood that when such products as shucked oysters or shelled green peas are spread upon a sufficiently cold refrigerated plate the surface moisture on the product units at once freezes to the plate, thus attaching the product units firmly to the surface of the plate. I have discovered that by moving a sharp edged member across the refrigerated plate with its edge held continuously substantially in contact with the surface of the plate it is possible to act upon the ice or frost film between the plate and the product units, substantially removing the film from the plate and so separating the product therefrom without the slightest damage. This is true even in the case of oysters, which, on account of their relatively large area, high moisture content and delicate structure, present an extremely difficult problem.

My novel process is therefore in part characterized by substantially continuously removing from the refrigerated surfaces the frost or ice formed thereon by congelation of moisture from the moist food products or from condensation and congelation of water vapor from the atmosphere surrounding them, and thus freeing the product so that it may be advanced across the refrigerated surface and lifted and perhaps turned in the process in order that the whole area of the product may be congealed as early as possible in the freezing process. When that stage is reached further movement of the product may be effected easily and without requiring all the precautions necessary in the presence of uncongealed surface moisture.

In accordance with the process of my invention I may utilize the sharp edged members not only for freezing the product but for lifting it from the refrigerating surface in limited and progressively advancing areas, thereby forming a wave or a wave crest in the mass of the product. As the product units are lifted in this wave formation they tend to shift position so that the unfrozen areas of their surfaces are likely to contact with the refrigerating surface when it is next encountered. The wave motion also serves to expose the product units to a refrigerated atmosphere which it is desirable to provide in the spaces between the refrigerated plates and, further, it tends to advance the product intermittently along the refrigerating zone. Still another result of this treatment is continuously to change the positions of the product units with relation to the upper and lower surfaces of the mass of product being frozen, thus reducing the temperature of the whole mass. Another effect of the use of the sharp edged members is to mix fine particles of congealed moisture (from the plates) into the mass of product, from which they absorb heat and to which they have a tendency to adhere in such a way as to prevent the product units so created from sticking to the refrigerated plates. Altogether it will be seen that the wave motion treatment of the product has a multiplicity of important functions all contributing to increase the range and efficiency of my refrigerating process.

While the product is intermittently advanced by the wedging action of the sharp edged member in passing beneath it, I have found it usually desirable to provide additional product moving and mixing instrumentalities. For example, the walls defining the freezing zone wherein the product is confined upon one or more of the refrigerating plates may be moved longitudinally or circumferentially, with the result that they tend to carry the mass of the product along with them. If desired, additional product-feeding members, such as drag scrapers, may be provided to travel along the freezing zone and advance and also transversely deflect the product. Various combinations of these instrumentalities for advancing and mixing may be organized with the various refrigerating plates of the series, and various product-moving effects thus realized depending on the requirements of the particular product being treated, as well as its stage of refrigeration.

Experiments have shown that several factors are vital to the success of this kind of a quick freezing apparatus, whether it is to be used for freezing liquids or solids, and that the apparatus best suited for freezing comparatively dry products may be somewhat modified in its details if it is to perform equally well on fluids or liquids.

The main purpose of my invention is to quick freeze various types of moist food products, some of which are surface-moist and others, such as crushed fruits, cream or apple cider, are definitely fluid or liquid. Substantially all these food products have a very high water content and are to be distinguished from hard dry products which do not adhere tightly to heat transfer plates and are not injured by rough handling in the apparatus. When a stack of spaced plates is used to freeze moist food products, there arise many problems not heretofore met with in heat exchange processes in which the product is passed along and in direct contact with heat-conductive surfaces.

Such fluids as crushed fruits, broken eggs or cream instantly freeze to the cold plates to form a thin layer of frozen product (frequently having a different specific gravity from the rest of the mass) which must be literally peeled from the plates and mixed with the unfrozen product until the whole mass of fluids has been reduced to the desired temperature. Very watery liquids such as cider adhere to the plates as a thin layer of water ice which must be cut or chipped away from the plates in much the same way as thin layers of ice are sometimes shaved from a large ice cake.

When relatively warm products having a high water content are introduced into this apparatus, deposited on to the cold freezing plates and advanced through the apparatus in such a manner that they are constantly in contact with both metal and air colder than themselves they begin immediately to lose part of their moisture content, and this moisture loss from the product would continue throughout its progress through the apparatus unless compensated for as explained hereinafter. The loss of moisture from the product takes place by two distinct processes. Some of the surface moisture freezes to the plates, and additional moisture is lost because of the vapor pressure conditions resulting from the fact that the product is constantly surrounded by air or other gas at a temperature considerably lower than that of the product itself. The moisture thus removed from the product may seriously interfere with the satisfactory operation of the apparatus by accumulating on the freezing surfaces of the plates as a gradually increasing layer of ice and by building up an accumulation of frost on the under sides of the freezing plates and other metal surfaces of the apparatus where its presence is highly undesirable. Provision must therefore be made to remove constantly from these freezing zones of the plates, by means of the scraping knives, ice which would otherwise build up upon the plates, and, in some cases, it may be advisable to dehydrate the gaseous atmosphere of the apparatus by depositing its moisture content in some part of the apparatus where it cannot hinder operations.

The process of my invention is particularly valuable in its application to the freezing of fresh moist food products in that it results in a frozen product in which substantially the full normal moisture content of the fresh product is maintained without reduction. This is important because the evaporation which inevitably takes place during storage tends to remove moisture from any frozen product and if the product has been substantially dried in the freezing process to begin with, it will be further dried in storage so that it is likely to present an uninviting discolored appearance in its outer layers.

The process of my invention is characterized by the step of continuously returning to the mass of product being treated the moisture which has been separated from it in the form of ice. The freezing operation is carried out in an enclosure and all the moisture removed from the product being frozen is therefore deposited upon the refrigerated surfaces of the enclosure as an ice film or as frozen crystals. These are scraped from the surface upon which they have been deposited and caused to mingle with the product. Thus the weight of the frozen product at the conclusion of the process is substantially the same as the weight of the fresh, moist product delivered to the apparatus. Evaporation of moisture from the product as packed in storage is therefore from the frozen ice crystals rather than from the skin of the product itself.

In order to secure the maximum capacity from the apparatus it is desirable that the freezing plates be at all times covered with the product to a uniform depth and to maintain the product so distributed on each plate of the apparatus from top to bottom. In order that the product may be kept in an even layer over the entire surfaces of the several plates and at the same time be advanced across the plates and through the apparatus at the proper rate, it is desirable that the product flow constantly up and over the scraper blades, simultaneously being advanced just the right distance along the plates to accomplish its journey through the apparatus in the desired time period. It is, of course, necessary further that the product, which is deposited only at one point on the top plate of the machine, shall be taken from that point at such a speed that it will gradually form the desired thickness of layer over the entire surface of the top plate. To accomplish these necessary results the scraper blades must be of the right shape, number and size and must be operated at the proer speed along the plates. Progress of the product will be positively affected by its contact with the side walls which delineate the freezing zones on the several plates, and to obtain the right product speed, spread and motion it is necessary to coordinate the type of wall (moving or stationary), the blades, the angle at which the blades are set relative to the horizontal and to the diameters of the plates, and the speed of the blades.

In an apparatus of this kind having a large hourly capacity the freezing plates may be several feet in diameter and the freezing zone itself eight inches or more wide. It is somewhat difficult to make such plates perfectly level throughout their entire area or to keep them level under the varying temperature conditions under which they are operated. Yet the blades or other means used to cut the product from the plates and to advance it through the apparatus must at all times be in intimate contact with the plate surfaces, or separated from those surfaces by only a very thin layer of congealed moisture. Accordingly, as herein shown, the blades are self-adjusting for this purpose and provided with yielding means continuously urging their edges towards the flat surface of the plate over which they move.

These and other features of the invention will be best understood and appreciated from the following description of a preferred embodiment of the apparatus or freezing machine and of the manner of practicing the process of my invention in connection therewith.

In the accompanying drawings—

Figure 1:
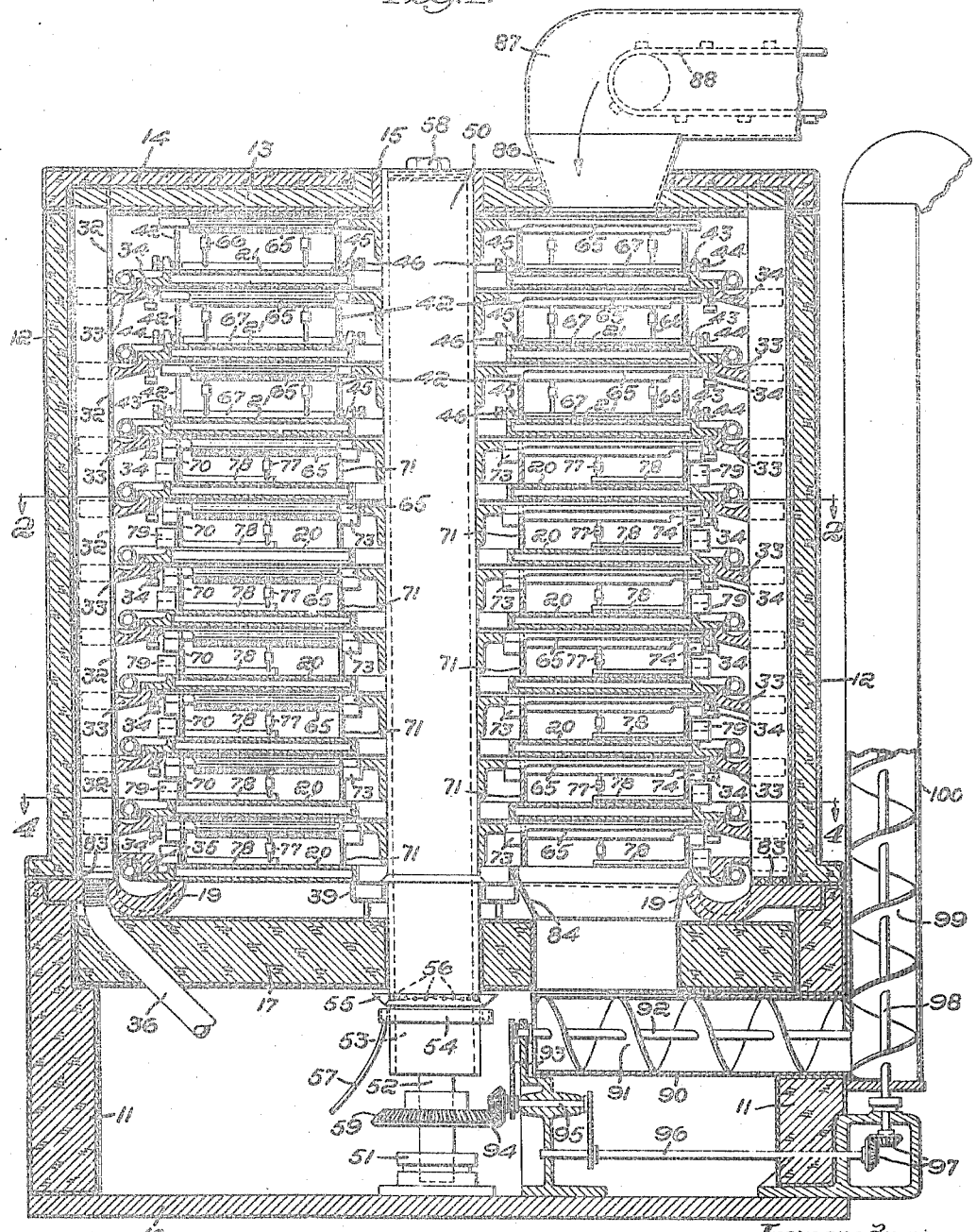
Fig. 1 is a view in vertical section of the apparatus.
Figure 3:
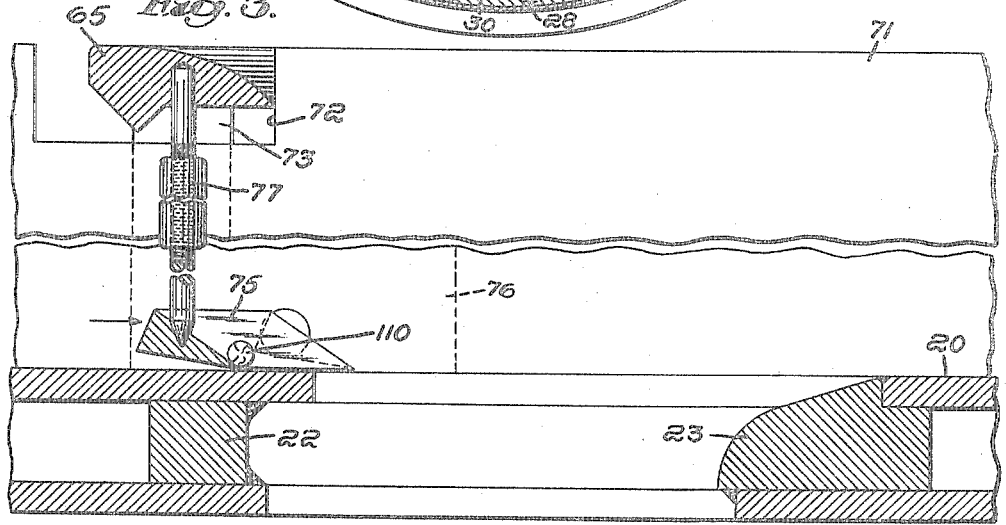

Fig. 3 is a fragmentary view partly in cross section, showing a portion of one plate and the inner wall thereon, Fig. 4 is a view in cross section on the line 4—4 of Fig. 1, Fig. 5 is a view of the base section of the apparatus in longitudinal section at right angles to that of Fig. 1, Fig. 6 is a view similar to Fig. 3 showing more especially one of the drag scrapers, Fig. 7 is a diagrammatic view in cross section illustrating the system of communication between the plates of the apparatus, Fig. 8 is a diagrammatic view showing progressive position of a unit in respect to a scraper blade, Fig. 9 is a fragmentary plan view showing the disposition of the product upon one of the refrigerating plates, and Fig. 10 is a fragmentary sectional view suggesting the wave formed by the action of one of the scrapers in passing through the product.

The apparatus as herein illustrated may be cylindrical or rectangular in shape and includes a base plate 10, a hollow base section 11, and a main section 12 disposed above and carried by the base section 11. The walls of the base and main sections are preferably hollow metallic shells having a filling of cork or other heat insulating material. The main section is closed at its upper end by a metallic cover 13 having an annular insulating plate 14 of the same general insulated construction as the body sections of the apparatus. The cover 13 is provided centrally with bearings 15 for a hollow vertical shaft 50 which will be referred to presently in more detail. The base section 11 is separated from the main section 12 by a horizontally disposed partition 17 having also metallic walls and a filling of insulating material and being supported upon an annular shoulder provided in the inner wall of the base section 11. The partition 17 is centrally apertured for the passage of the shaft 50.

The base section 11 is provided about its upper edge with a channeled supporting ring 19 which extends circumferentially in inwardly offset relation to the inner walls of the main section 12 and furnishes support for the lowermost refrigerated plate 20 of the series of refrigerated plates that are arranged within the main section 12 of the apparatus one above another in spaced vertical series. In the illustrated embodiment of the invention, ten of these plates are shown, the seven lower plates of the series being designated by the reference character 20 and the three upper plates of the series being designated by the reference character 21. The seven lower plates 20 are arranged with uniform spacing and the three upper plates 21 are also uniformly spaced but by a greater distance of separation than the plates 20. Each of the plates are annular in outline and hollow or chambered to receive a refrigerant. The chamber in each plate is divided diametrically by a partition 24 and staggered baffles are arranged radially in each chamber as shown in Fig. 4 to direct the refrigerating medium in a circuitous course.

Each of the plates is provided with an opening through which the product being treated may drop by gravity to the next lower plate. One such opening is shown in some detail in Fig. 3 and the relative arrangement of the openings in the series of plates is shown in Fig. 7. In each plate the opening is radially disposed and the rear wall thereof, that is to say, the wall over which the food product is pushed when it falls to the next lower plate, is formed by a radial filler piece 22 which also serves to close the refrigerating chamber in the plate. The upper wall of the plate 20 is undercut at the rear side of the opening so that the product may drop cleanly from it. The forward wall of the opening is formed by a substantially parallel filler piece 23 which closes the refrigerating chamber of the plate upon its side of the opening and which is provided with a smoothly ascending curved upper surface arranged to engage the scraper blades as they are advanced across the opening and to guide them smoothly up to the level of the plate surface in case they spring downwardly when unsupported in passing across the opening.

The plates 20—21 may be constructed of stainless steel or any other suitable metal, but if a softer metal is used for the body of the plates it is important to provide them with a hard smooth surface. Chrome-plated surfaces have proved very satisfactory in practice.

Figure 2:
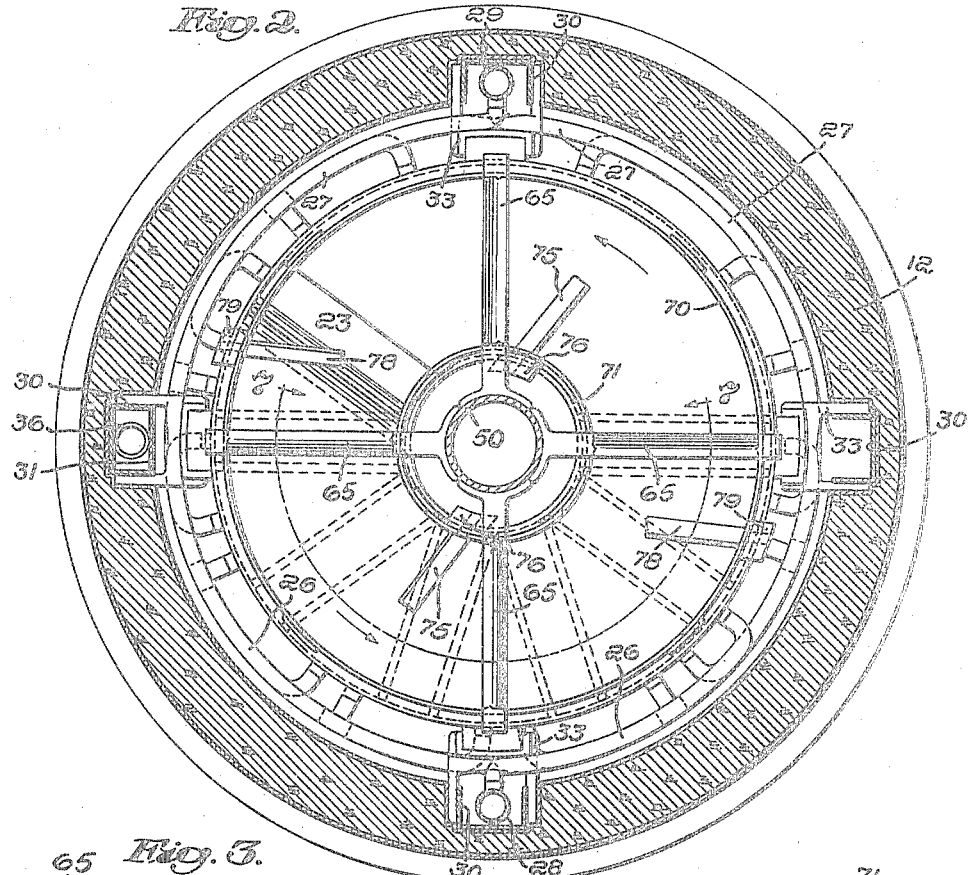
Fig. 2 is a view in cross section on the line 2—2 of Fig. 1.

The inner vertical wall of the main section 12 of the apparatus is provided at diametrically opposite points with vertical channels in each of which is located a channel iron 30 disposed so that it opens into the interior of the apparatus and thus provides a vertical channel as well as a rigid supporting element. One of these channel irons, that is to say the one disposed on the left of Figs. 1, 2 and 4, is utilized as an air or vapor duct and for that purpose is provided with a face plate 31 having a series of ports 32 therein which open on a level with the spaces between the plates 20 and 21. All of the channel irons 30 are provided with spaced brackets 33 upon which the plates 20 and 21 above the lower plate of the series are rigidly supported. Each of the brackets 33 is provided with a vertical leveling screw 34 and by manipulating these each plate may be brought accurately into horizontal position independently of every other plate. Each channel iron 30 carries a special clamp 35 which cooperates with the ring 19 to hold the lowermost plate 20 in place.

In one of the channel irons 30, that is to say, the one located toward the front in Figs. 2 and 4, is provided a feed header 28 for the refrigerating medium. This header is connected to the respective plates 20 and 21 by circumferentially disposed feed pipes 26 extending different distances from the header so as to arrange the points of connection with the respective plates in staggered relation as shown in Fig. 2. In the oppositely disposed channel iron 30 is provided a corresponding outlet header 29 and this is similarly connected to the plates 20 and 21 by a series of circumferential outlet pipes 27 also staggered in their points of connection with the respective plates.

A refrigerating unit 38 including a compressor of any desired commercial design may be located in the base section 11 of the apparatus and provided with a fan 37 by which partially dehydrated and refrigerated air or vapor is delivered through an inclined duct 36 to the bottom of the vertical duct formed by the plate 31. The refrigerated air or vapor is thus lead up through the vertical duct, passing out through the ports 32 and inwardly across the plates 20—21 and the product supported thereon and then downwardly in the central well which surrounds the shaft 50. Condensation from the descending current of air is collected in an annular drip pan 39 having an opening 40 which communicates with an inclined return duct 41 as shown in Fig. 5. It will be understood that the refrigerating unit 38 is suitaby connected, as by the pipe 47, to the feed header 28 and to the outlet header 29 so as to maintain a circulation of refrigerating medium through all the plates. The details of these connections are not fully illustrated since they form specifically no part of the invention, but may be provided by any commercial or usual construction. The base section 11 may also contain a motor 48 (Fig. 4) for operating the refrigerating unit thus making the apparatus complete and self-contained in this respect.

The three upper plates 21 are provided with stationary spaced walls 42 which define the product treating zone thereon. Each of the plates 21 is provided with a series of spaced outer lugs 43 and inner lugs 45. These lugs are provided with corresponding clamping screws 44 and 46 by which the walls 42 are rigidly clamped in fixed position upon the respective plates. These clamping screws form convenient means for adjusting the walls 42 to bring them into desired concentric position upon the plates, and when once adjusted the walls remain in place unless it is desired to remove them for cleaning or inspection. If desired a continuous flange may be substituted for the lugs 43 and 45 and thus provide a circular exterior dam for arresting liquid leakage beneath the walls.

We have now described the stationary parts of the apparatus and will pass to its moving parts. The body of the shaft 50 is of relatively large diameter and is hollow so that it may act as a reservoir for dry ice or other refrigerant if desired. The lower portion 52 of the shaft is solid and rests in a vertical thrust bearing 51 supported by the base plate 10. The lower end of the hollow portion of the shaft 50 is closed by a solid plug 53 and it is surrounded by a circular gutter or drip ring 54 communicating with a waste pipe 57 for disposing of the moisture of condensation. A perforated collar 55 surrounds the shaft 50 just above the drip ring 54 and this is arranged to intercept moisture running down the shaft 50 and to distribute it through ports 56 to the drip ring 54. The shaft 50 is provided at its upper end with a screw plug cover 58 removable to permit the interior of the shaft to be filled with a refrigerant. The shaft 50 is rotated by a large bevelled gear 59 which is secured to its lower solid section 52 and driven through a bevelled pinion 60 shown in Fig. 4 as part of a gear reduction set 61 operated through suitable connection with a motor 62.

The shaft 50 is provided with a series of sets of four radial arms 65 corresponding to each of the ten refrigerating plates 20 and 21. The arms 65 corresponding to the plates 21 are secured to the shaft at a level such that they pass freely above the stationary walls 42, whereas the arms 65 corresponding to the seven lower plates 20 of the series are arranged to interlock and rotate the outer annular walls 70 and the inner annular walls 71 of these plates. The arms 65 associated with the upper plates 21 are each provided with a shallow, sharp edged member acting as a drag scraper 67 and carried by a pair of adjustable turn buckle rods 66. These rods extend at a rearward inclination downwardly from the arms 65 and maintain the forward edge of the scraper continuously in contact with the upper or product-supporting surface of the refrigerating plates 21. The scraper blades 67 are triangular in shape and engage the surface of the plates only at their advancing edge and in such position as to shave the thin film of ice which is continually formed on the surface of the plate, thus freeing the product from it without in any way mutilating or disfiguring it. In their shape and general arrangement the scrapers 67 are similar to scrapers 75 and 80 which will be presently described in connection with the refrigerating plates 20 and in their movement they generally travel beneath the surface of the mass of product spread upon the plates 20, lifting or wedging away from the refrigerated surface of the plate portions of the product progressively in advancing areas and so forming waves in the product and at the same time causing it to advance in a series of intermittent steps at a slower rate than that of the waves therein.

The outer walls 70 and the inner walls 71 associated with the plates 20 are each provided with four notches 72 at diametrically opposite points in its upper edge and into these notches fit the radial arms 65 thus making interlocking driving connections 90° apart between the shaft 50 and the respective walls. Each arm is provided with inner and outer reinforcing blocks 73 and 74 respectively which engage the cylindrical surfaces of the rings and hold them in the desired concentric position during their rotation upon the plates. The inner walls 71 of certain plates 20 are provided with a series of scraper blades 75 each of which has at its inner end a cylindrical shank extending through the wall 71 and into a block 76 rigidly secured to the wall. The outer end of each blade 75 may be connected to the arm 65 above it through an adjustable turn buckle rod 77. As shown in Figs. 3 and 6, the inner scraper blades are shallow and triangular in cross section, the heel of the scraper being elevated from the surface of the plate 20, and its thin bevelled edge being maintained in such close contact therewith as to split the ice film between it and the product. For example, in Fig. 3 the blade of the scraper 75 is shown as separating a frozen pea 110 from the plate in this manner. Each scraper blade 75 is set at an angle of substantially 10 degrees behind a radius from its point in intersection with the wall 71 and thus, in being passed through the product on the plate advances obliquely and tends to displace the product outwardly as well as to form an advancing wave therein and to advance the whole mass of the product at a slower rate. The angular relation of this scraper blade is important also since it prevents any tendency to trap the product and carry it around without transverse displacement upon the plate. Instead the product is caused to travel lengthwise of the blade to some extent and toward its free or inner end.

Each scraper blade 75 and 78 is free to rock about the longitudinal axis of its shank and is provided with an arm 68 connected to a tension spring 69 which tends to rock the scraper in a direction to hold its sharp edge always in contact with the plate surface. The bearings for the scrapers also permit a slight rocking movement up and down so that the turn-buckle rod is effective to hold the free end of the scraper down firmly on the plate.

The outer wall 70 is correspondingly provided with four scraper blades 78 which pass through the wall and are similarly mounted in blocks 79 secured to its outer face. The outer scraper blades 78 are identical to the blades 75 in shape but are preferably set at a retreating angle of 20 degrees to a corresponding radius. Accordingly they have a tendency to displace the product inwardly as well as to form an advancing wave therein and to advance the product itself. The scraper blades 75 and 78, it will be observed, move in annular zones and engage the product adjacent to the inner and outer walls 70 and 71. In order to operate upon the product which lies between these zones and in somewhat overlapping zones, on certain plates 20 some of the arms 65 are provided with drag scrapers 80 of the same shape as that already described and connected to the arm by means of one or more adjustable turn buckle rods 81.

While in most instances the scraper blades may be carried by the radial arms 65, and are so shown, I contemplate the provision of separate bridge members for this purpose wherever desirable. Such a bridge member 64 is shown in Fig. 9, being clamped to the movable walls 70—71 and carrying the scraper blade 80 by means of the rod 81.

The fresh moist food product or other product to be frozen or congealed may be supplied continuously to the uppermost plate or plates through the medium of a supply chute 86 which passes down through the cover of the apparatus and is arranged to discharge upon the top plate 21 in a location removed 320 degrees or more from the discharge opening in that plate. The product may be supplied to the chute 86 by a belt conveyor 88 operating in a duct or casing 87. It will be understood that the product is advanced along the annular treating zone of the uppermost plate 21 until it reaches the discharge opening between the filler blocks 22 and 23. When it reaches this opening it drops by gravity upon the surface of the second plate 21 and is similarly carried round upon this plate and so on to the third plate 21. Subsequently it is delivered to and treated upon the seven lower refrigerating plates 20, finally passing from the bottom plate downwardly through a discharge chute 84 and a corresponding opening in the horizontal partition 17. The frozen product then passes to a horizontal screw conveyor comprising a casing 90, a shaft 92 and a screw 91, as shown in Fig. 1. The shaft 92 is driven from the bevelled gear 59 on a shaft 52 through a bevelled pinion 94 and sprocket chain connection 93. The horizontal conveyor delivers to a vertical duct 100 containing a screw conveyor 99 having a shaft 98. The shaft 98 is driven through bevelled gears 97 from a shaft 96 having a driving connection with the shaft 95 of the bevelled pinion 94. The frozen product is thus elevated and discharged from the apparatus at a level such as to prevent any danger of syphoning out the cooled gas within the apparatus.

Various combinations of spreading and scraping equipment may be employed in connection with the various plates of the apparatus. It will be understood that this equipment may be varied according to the product being treated and conditions of operation. As illustrated, the uppermost plates 21 having the stationary walls 42, are equipped with four long scraping blades 67 each supported from one of the radial arms 65 by a pair of adjustable turn buckle rods 66. These blades extend substantially across the entire refrigerating zone as defined by the walls 42 and are disposed in substantially radial position with respect to the circular freezing zone. In Fig. 2 the fourth plates from the top in the series is shown as provided with movable walls 70 and 71 arranged to be rotated by the radial arms 65. The outer wall is provided with a pair of inwardly projecting scraper blades 78, and approximately 90° therefrom the inner wall is provided with outwardly projecting scraper blades 75. In this arrangement the blades 75 and 78 overlap in their zones of movement and their action on the product is like that described in connection with the scrapers 67.

As already explained all of these blades are set at a rearward inclination to a radius at their point of support so that they tend to shift the product toward the center of the freezing zone. The blades 75 and 78 in Fig. 2 are shown without support at their free ends while in Figs. 3 and 9 an adjustable rod 77 is provided for that purpose, it being understood that this is an optional feature desirable in relatively long scraper blades and not required in connection with shorter blades. Short drag blades 80 mounted upon the arms 65 or bridge members 64 through the medium of single adjustable turn buckle rods 81 may be added to the equipment of any of the upper plates in the series, as suggested in Fig. 9, or they may be carried by a pair of turn buckle links instead of a single link.

As already suggested, the plates 20—21 may be refrigerated to a temperature of —45° F. or lower by the circulation of brine or by the direct expansion of ammonia therein. The atmosphere within the apparatus, air, $CO_2$ or any desired mixture of gases, is chilled to substantially the same degree, circulated in the spaces between the plates and partially dehydrated by being brought into contact with the refrigerated pipes of the unit 38. The chilled and dehydrated gas may be circulated in the apparatus in any desired path. That shown for illustrative purposes is upwardly adjacent to the outer circumference of the plates, inwardly across the product supported upon the plates and downwardly around the shaft 50.

The refrigerating medium may be delivered to the respective plates in accordance with any desired plan. In one satisfactory arrangement the amount of heat transfer which takes place at each plate is substantially uniform. Consequently the unfrozen or slightly frozen product raises the temperature of the upper plates in the series to a degree somewhat above that of the lower plates in the series. Each plate, however, is substantially colder than the product upon it and the dehydrated gas circulating over the product is always colder than the product with which it is in contact.

Having described the apparatus in some detail the process of treating the product therein will be now discussed. The product may be either a fresh moist food product, such as green peas, oysters, berries or the like having considerable surface moisture or it may be a liquid product such as cream, fruit juice or the like or a combination of the two, such as berries and cream.

As it is delivered to the uppermost plate 21 a solid mass of product first piles up beneath the end of the delivery chute 86 and then is spread out by the passage of the arms 65 and the blades 67 through the pile. An infinitesimal layer of ice is formed directly on the surface of the plate between the plate and each unit product touching it. This is almost immediately removed by action of the scraper blades 67, 75 or 78 which, as already explained, move with their sharp edges in contact with the surface of the plate, or at least pressed firmly toward it, and separate the film of ice from the plate without damage to the product. The ice particles thus removed are mixed with the product and tend to cool the mass thereof. In passing through the mass of product each of the blades produces a wave which travels ahead at the same rate of speed as the blades and the resultant action of the blades is to set up in the whole mass of product an intermittent advancing motion, but at a considerably slower rate than the rate of wave movement. In dealing with a solid product the individual particles become congealed upon that part of their surface which first touches the plate and in the continued movements of the scrapers they are removed from and returned again and again to contact with the plate in different positions so that eventually they present a dry frozen surface having little or no tendency to stick to the refrigerating plates or to other units of the product.

In the case of liquid products the frozen film is removed from the plate surface and returned to the body of the product, being at first remelted in the mass but eventually chilling it and transforming it to the condition of a wet mush. In passing about the treating zones of the three uppermost plates 21 the product is moved between the stationary walls 42, but when it drops from the third to the fourth plate it is confined to movement between the revolving walls 70 and 71. By this time the surface condition of the product is such that it does not stick to the refrigerating surface nor is there present an excess of free liquid. Upon these surfaces provision is therefore made for shifting the product laterally as well as advancing it. Thus an increased degree of surface contact is brought about between the partially frozen product and the refrigerating plates. The desired movement, as already pointed out, is secured by the cooperative effect of the inner scaper blades 75 which tend to displace the product outwardly, the outer scraper blades 78 which tend to displace the product inwardly, and the intermediate scraper blade 80 which to some extent overlaps the inner and outer zones of activity and tends, in general, to advance the product in a circumferential path. The resultant movement imparted to the product is one of circumferential intermittent advance combined with a transverse or lateral weaving motion.

In treating a liquid product there is a decided tendency in the early stages of the process to freeze out the pure water content of the product in ice crystals which are of greater specific gravity than the remaining product. If desired a concentrating or fractionating result may thus be obtained, the heavier ice crystals being removed from the mass in any convenient manner. Ordinarily, however, a fluid product is converted into a slush of the desired temperature and dryness and then the slush is discharged from the apparatus, packed solidly in suitable containers and further frozen in package form if desired.

The product has been described as being advanced upon the refrigerated surfaces of the apparatus in direct contact therewith and the sharp edged members as moving in direct contact with the surfaces, but it will be understood that the presence of a very thin film of ice or frost does not interfere with the successful carrying out of the process. The terms in question should therefore be construed herein with corresponding latitude.

In treating a fluid or semi-fluid food product it may be advantageous to deliver it simultaneously to more than one of the uppermost plates in the series so that the initial chilling is somewhat equalized and takes place over a more extended area than if confined to the uppermost plate alone of the series. Satisfactory results are secured by causing a portion of the fluid product to overflow from the first to the second plate.

The novel apparatus of my invention is not herein claimed but forms the subject matter of divisional application Serial No. 264,793 filed March 29, 1939, and based on substantially the same disclosure.

Having thus disclosed my invention I claim as new and desire to secure by Letters Patent:

1. A process of freezing food products which consists in spreading the product on a flat heat-conductive refrigerated plate, forcibly separating the product from the plate in an advancing wave, and advancing the product along the plate at a speed less than that of the wave of separation.

2. A process of freezing food products which consists in spreading the product on a flat heat-conductive refrigerated plate, forcibly separating the product from the plate in an advancing wave, advancing the product along the plate at a speed less than that of the wave of separation, and simultaneously moving portions of the product transversely of the general forward direction of the mass of the product.

3. A process of freezing a moisture-containing food product which consists in spreading the product on a flat horizontal refrigerated surface, and advancing the product along and in contact with the surface, meanwhile separating from the surface congealed moisture from the product.

4. A process of freezing a mass of moisture containing food product units which consists in spreading the product in a refrigerated surface, advancing the product along and in contact with the surface, meanwhile separating from the surface congealed moisture from the product, and causing a portion of said removed congealed moisture to adhere to individual units of the product.

5. A process of freezing food products which consists in spreading the product on a flat heat-conductive refrigerated plate, forcibly separating the product from the plate in an advancing wave, advancing the product along the plate at a speed less than that of the wave of separation, and simultaneously changing the positions of the individual units of the product with respect to the upper and lower surfaces of the mass of product.

6. A process of freezing food products which includes the steps of moving the product along and in contact with a series of superposed flat heat-conductive refrigerated surfaces, lowering the product from surface to surface, and simultaneously exposing the upper portions of the product on said surfaces to a current of partially dehydrated refrigerated gas having a temperature lower than the average temperature of the product over which the gas passes.

7. A process of freezing a mass of moist food product units, such as shelled fresh peas, which includes the steps of spreading the units upon flat, horizontal refrigerated plates to which they adhere by freezing, continuously separating the units from said plates until all the units cease to adhere to the plates, and then advancing the units in a partially frozen condition upon other refrigerated plates until the units have become solidly frozen.

8. A process of freezing foods which includes the steps of spreading the food on an upper plate of a series of superposed heat-conductive plates, advancing the product along the said plates, removing the product to a plate lower in the series, moving the product along the second plate, continuing to lower the product from plate to plate in the series, discharging the product from the lowermost plate along which it has been passed, and throughout the above-mentioned steps of the process maintaining the upper surfaces of each of the several plates in the series at a temperature both lower than that of the product upon it and lower than that of the plate next above in the series.

9. A process of freezing fluid food products which consists in advancing the product between stationary walls upon a refrigerated surface, scraping the frozen part of the product from the surface between the stationary walls until a substantial part of the liquid has been congealed, and then advancing the partially congealed mass of product upon a refrigerated surface between movable walls until the product is more fully frozen.

10. A process of freezing moist food products which includes the steps of spreading a mass of the product in a shallow layer on a flat refrigerated heat-conductive surface and then progressively wedging the product away from said surface to separate the product from the surface, and advancing the product intermittently along the surface while maintaining substantially the layer formation of the product.

11. A process of freezing moisture-containing food products which includes the steps of distributing the product in a layer upon a refrigerated surface to which the product becomes frozen, and then wedging the product away from the surface along opposite sides of the layer to separate the product from said surface, advancing the product along said surface and simultaneously imparting to it a transverse motion first toward one edge of the surface and then toward the other edge thereof.

12. A process of freezing a food product which includes the steps of spreading a mass of the product in a layer upon a refrigerated surface to which the product becomes frozen, wedging the product away from said surface to break its frozen contact with the surface, causing units of the product to pass upwardly away from the surface and to acquire a forward motion along the surface and simultaneously to retard or accelerate the speed of that portion of the product along the edges of the refrigerated surfaces.

13. A process of freezing a food product consisting of a mixture of relatively hard separate units combined with free flowing fluid, which includes the steps of spreading the product in a layer on a refrigerated surface to which the product becomes frozen, wedging the product away from the surface, thus separating the frozen portions of the product from the surface and imparting to limited portions of the product a forward motion along the surface, continuing the above process until the free flowing part of the product has been frozen to a slush and removing the mass of product from the refrigerated surface before the individual relatively hard units of the product have been lowered throughout their thickness to a temperature as low as that of the surrounding slush.

14. A process of freezing a free flowing food product which includes the steps of placing portions of the product simultaneously on several superposed refrigerated heat-conductive surfaces, advancing said product along each surface, dropping the product from each of the said surfaces to the next lower surface and simultaneously progressively slushing the product as it passes from top to bottom of the series of surfaces.

15. A process of freezing a moist food product, which includes the steps of spreading the product in a relatively long and narrow zone upon a refrigerated surface, progressively lifting the product from the surface in limited areas, thus forming advancing waves in the product, not all of said waves extending completely across the mass of product from side to side of the freezing zone.

16. A process of freezing a moist food product which includes the steps of spreading a mass of the product upon a refrigerated surface, forming in the mass on the surface a progressively advancing wave, and advancing the product across said surface at a rate different from that of the wave movement.

17. A process of freezing a moist food product, which includes the steps of spreading the product on a substantially flat refrigerated metal plate, advancing portions of the product intermittently along said plate, removing congealed moisture from the plate, and causing the said congealed moisture to intermingle with and to remove heat from the individual units constituting the food product.

18. A process of freezing moist food product units, such as shelled peas, which includes the steps of advancing the product along a flat refrigerated surface while maintained as a shallow layer thereon, recurrently bringing some of the individual units into direct contact with the said refrigerated surface, and removing them from such contact and exposing them to a current of refrigerated gas.

19. A process of freezing a moist mass of food product units, such as peas, which includes the steps of freezing some of the units of the mass to a refrigerated plate, separating those units from the plate and mixing them with the unfrozen mass, and then freezing the same or other units again to the plate and so on until all the units acquire non-adherent surfaces.

20. A process of freezing moist food products, which consists in spreading the unfrozen product on a flat refrigerated surface, and advancing the product intermittently along the surface and intermittently in contact with the surface, meanwhile separating from the surface congealed moisture from the product.

21. A process of freezing moisture-containing food products, which consists in spreading a mass of the unfrozen product on a flat refrigerated surface in an enclosed space, advancing the product along the surface while moisture from the product congeals thereon, separating the congealed moisture from said surface and continuously returning it in the form of ice particles to the product, thereby maintaining the moisture content of the mass against substantial reduction during the freezing process.

22. A process of freezing food products, which includes the steps of moving a mass of the product along and in contact with a series of superposed flat refrigerated surfaces, lowering the product from surface to surface, and simultaneously exposing the product on said surfaces to a refrigerated, non-oxidizing gas having a temperature lower than the average temperature of the product being moved upon the refrigerated surfaces.

23. A process of removing heat from a moist product, including the steps of spreading the product on the upper surface of a refrigerated plate, advancing the product along and in contact with said surface while intermittently lifting limited areas of the product therefrom, causing moisture from the product to congeal upon the said surface, scraping from the said surface congealed moisture from the product, and causing said congealed moisture to become mingled with the product.

24. A process of freezing products containing water, including the steps of spreading the product between two heat conductive surfaces but not in contact with the upper of such surfaces, advancing the product along the lower of said surfaces, meanwhile causing refrigerated gas to circulate between the said refrigerated surfaces so as to remove moisture from the product, depositing some of the gas-born moisture upon the refrigerated surface above the product so as partly to dehydrate the said gas, removing said congealed moisture from one of said surfaces and causing said congealed moisture to become mingled with the product being frozen.

25. The process of freezing a mass of moisture-containing food product units, such as shelled fresh peas, the majority of which units are partially covered with a surface film of moisture, which includes the steps of spreading the units upon a refrigerated surface, advancing the product between two refrigerated heat conductive surfaces, meanwhile removing from the individual units of the mass part of their film of surface moisture by evaporation through a gas atmosphere above the product mass, causing some of said evaporated moisture to become deposited upon the said refrigerated surfaces in the form of ice crystals, and subsequently scraping said ice crystals from some of said refrigerated surfaces and causing the crystals to become mixed with the mass of food units.

26. A process of freezing a mass of food product units, such as shelled peas, which consists in spreading the mass of units on one refrigerated surface and under but not in contact with another refrigerated surface, advancing the product along and in contact with the lower of said surfaces, meanwhile scraping from the said surface congealed moisture, causing a portion of said congealed moisture to mingle with, melt and remove heat from the said product until the surfaces of the product units have been lowered to approximately the freezing point of the congealed moisture, and thereafter causing other particles of the congealed moisture removed from the said refrigerating surfaces to become mingled with and to adhere in an unmelted condition to the individual units of the product mass.

27. A process of freezing a non-homogeneous food product, consisting of a mixture of relatively hard separate units, such as cut strawberries and a free-flowing material such as syrup, which process includes the steps of spreading the product on a horizontally disposed flat refrigerated surface, progressively lifting the product in limited areas from said surface, thus forming an advancing wave in the product, and continuing the above steps on other refrigerated flat surfaces until the free-flowing part of the product has been frozen to a slush.

28. A process of freezing a free-flowing product containing a fluid, which includes the steps of placing part of the product on each of several superposed refrigerated heat conductive surfaces and advancing the product across said surfaces, meanwhile forming in the product on each surface a progressively advancing wave having a speed greater than that of the average speed of the product across the surface, dropping the product from each surface to the next lower surface and progressively slushing the product during the above steps by forming within the mass of product congealed particles of a specific gravity different from that of the mass of the product when first spread on the refrigerated surfaces.

29. A process of freezing food products, which includes the steps of spreading the product on one of a series of superposed flat heat-conductive surfaces, forming in the mass a progressively advancing wave, advancing the product across the surfaces at a rate different from that of the wave movement, dropping the product successively to the refrigerated surfaces lower in the series, forming in the mass on each of the said lower surfaces a progressively advancing wave, and advancing the product across each of the said lower surfaces until the product is discharged from the lowermost surface across which it has been passed.

30. A process of freezing fluid food products containing oxidizable elements, which consists in spreading the product on a refrigerated surface, advancing the product along and in contact with the surface, meanwhile separating from the surface congealed moisture from the product, causing at least a part of said congealed moisture to mingle with and remove heat from the product, and maintaining over the product an atmosphere of non-oxidizing gas having a temperature lower than that of the average temperature of the mass of product.

31. A process of freezing moist food products which consists in spreading the unfrozen and partially frozen product on a series of flat refrigerated surfaces, advancing the product intermittently along the respective surfaces and intermittently in contact with the said surfaces, meanwhile separating from the surfaces congealed moisture from the product, and transferring the product from surface to surface progressively carrying with it in each instance the congealed moisture which has been separated from the preceding surface in the series.

CLARENCE BIRDSEYE.